US008836784B2

(12) United States Patent
Erhardt et al.

(10) Patent No.: US 8,836,784 B2
(45) Date of Patent: Sep. 16, 2014

(54) AUTOMOTIVE IMAGING SYSTEM FOR RECORDING EXCEPTION EVENTS

(75) Inventors: Herbert J. Erhardt, Webster, NY (US); Robert M. Guidash, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 400 days.

(21) Appl. No.: 12/912,790

(22) Filed: Oct. 27, 2010

(65) Prior Publication Data
US 2012/0105635 A1 May 3, 2012

(51) Int. Cl.
*H04N 9/47* (2006.01)
*H04N 7/18* (2006.01)

(52) U.S. Cl.
USPC ................................... 348/148; 348/E7.085

(58) Field of Classification Search
CPC .... B60R 1/00; B60R 2300/105; B60R 11/04; B60R 2300/802; H04N 7/181
USPC ........................................................ 348/148
See application file for complete search history.

(56) References Cited

U.S. PATENT DOCUMENTS

| | | | |
|---|---|---|---|
| 6,141,611 A | 10/2000 | Mackey et al. | |
| 7,348,895 B2 | 3/2008 | Lagassey | |
| 7,362,215 B2 | 4/2008 | Janssen | |
| 7,423,529 B2 | 9/2008 | Singer et al. | |
| 7,500,794 B1 | 3/2009 | Clark | |
| 7,537,400 B2 | 5/2009 | Schmid | |
| 7,602,947 B1 | 10/2009 | Lemelson et al. | |
| 7,657,354 B2 | 2/2010 | Breed et al. | |
| 8,140,358 B1* | 3/2012 | Ling et al. | 705/4 |
| 2003/0081121 A1 | 5/2003 | Kirmuss | |
| 2003/0098909 A1 | 5/2003 | Fritzsche et al. | |
| 2006/0208874 A1* | 9/2006 | Chen | 340/539.1 |
| 2007/0001836 A1 | 1/2007 | Singer et al. | |
| 2007/0002021 A1* | 1/2007 | Lin | 345/166 |

(Continued)

FOREIGN PATENT DOCUMENTS

| | | |
|---|---|---|
| DE | 42 21 280 | 1/1994 |
| EP | 1 646 240 | 4/2006 |
| FR | 2 887 064 | 12/2006 |
| WO | 02/095757 | 11/2002 |

OTHER PUBLICATIONS

"Denver company puts auto thieves on candid camera," Denver Business Journal, Oct. 14-20, 2005, p. A7.

(Continued)

*Primary Examiner* — Dave Czekaj
*Assistant Examiner* — Nam Pham

(57) ABSTRACT

A motor vehicle system for automatically reporting exception events, comprising: one or more digital cameras, at least one digital camera having a primary function; an image memory system for storing digital images; means for detecting exception events; and a wireless communications system for communicating with a central reporting service. A program memory stores executable instruction for causing a processor to perform the steps of: using at least one of the digital cameras to periodically capture digital images at a specified capture frequency; storing the periodically captured digital images in the image memory for a specified period of time; and receiving input from the means for detecting an exception event. In response to the detection of an exception event a communication link is opened to the central reporting service using the wireless communications system, and one or more of the captured digital images are transmitted to the central reporting service.

28 Claims, 2 Drawing Sheets

(56) References Cited

U.S. PATENT DOCUMENTS

| | | | |
|---|---|---|---|
| 2007/0216136 A1* | 9/2007 | Dietz | 280/477 |
| 2008/0061951 A1 | 3/2008 | Liu | |
| 2008/0165251 A1 | 7/2008 | O'Kere | |
| 2008/0297330 A1* | 12/2008 | Jeon | 340/426.11 |
| 2009/0024309 A1* | 1/2009 | Crucs | 701/118 |
| 2009/0278933 A1* | 11/2009 | Maeda et al. | 348/148 |
| 2010/0077437 A1* | 3/2010 | McManus et al. | 725/75 |
| 2010/0157061 A1* | 6/2010 | Katsman et al. | 348/149 |
| 2010/0171642 A1* | 7/2010 | Hassan et al. | 340/992 |
| 2011/0181711 A1* | 7/2011 | Reid | 348/121 |

OTHER PUBLICATIONS

International Preliminary Report on Patentability for PCT/US2011/056805, mailed May 10, 2013.

* cited by examiner

AUTOMOTIVE IMAGING SYSTEM FOR RECORDING EXCEPTION EVENTS

FIELD OF THE INVENTION

The invention relates generally to the field of automotive imaging systems employing digital cameras, and more particularly to a motor vehicle system that automatically transmits digital images in response to detecting an exception event.

BACKGROUND OF THE INVENTION

Many modern automobiles include integrated digital camera systems. Typical applications for these digital camera systems are blind spot monitoring, lane departure warning, rear view blind spot view, collision avoidance, traffic sign recognition, and drowsy driver detection. Typically, these systems incorporate visible or near infrared (NIR) capable image sensors.

In many cases, the digital image data captured by the digital cameras is never rendered or viewed, but rather used in a machine vision system as information for making decisions. Once the digital image data has been analyzed and a decision has been made, the digital image data is generally discarded. The hardware and software required for the image processing, analysis and subsequent decisions and information transmission is designed and optimized for the specific application, and is often integrated and co-located with the camera.

In other cases, the digital image data may be displayed on a soft-copy display for viewing by an occupant of the automobile. For example, rear view or "back-up" cameras, are used to display live video to the driver to aid in safely maneuvering and avoiding otherwise unseen objects while moving in reverse. However, as with the machine vision applications, the digital images are generally not stored once they have been displayed.

These digital camera systems are separately integrated as modules in vehicles, and are specialized, optimized and dedicated solely to the specific application of that particular system, such as one of the examples cited above. FIG. 1 shows a top view diagram of a prior art motor vehicle imaging system 100 including a motor vehicle 105 fitted with four digital camera imaging systems: a blind-spot imaging system including two blind-spot cameras 110, one in each side view mirror; a forward-looking imaging system including a forward-looking camera 111 mounted on the front of the vehicle; an interior imaging system including an interior-view camera 112 mounted to view the driver and occupants of the vehicle; and a rear-view imaging system including a rear-view camera 113 mounted at the rear of the motor vehicle 105. All four of the separately integrated digital camera systems do not interact or interconnect and are dedicated to perform specific functions.

The blind-spot imaging system is used for the applications of blind spot monitoring, blind spot warning, and lane change assistance. The blind-spot imaging system captures digital images using the blind-spot cameras 110 to detect objects in the blind spot of the operator of the motor vehicle 105. The captured digital images are analyzed by a signal processor integrated into and dedicated to the blind-spot imaging system to provide warning information to the operator. The digital images are not displayed or rendered for viewing, and are discarded after analysis.

The forward looking imaging system is typically used for applications such as night vision, adaptive cruise control, collision avoidance, lane departure warning, and pedestrian detection. Digital images captured using the forward-looking camera 111 are analyzed by a signal processor integrated into and dedicated to the forward looking imaging system in order to make decisions for the described applications. Typically, they are not rendered for view or display, and are subsequently deleted.

The interior imaging system is typically used for applications such as drowsy driver detection, air bag deployment assistance, and facial recognition. As with the blind-spot imaging system and the forward looking imaging system, the interior imaging system does not typically render or display the captured digital images; rather, digital images captured with the interior-view camera 112 are analyzed by a signal processor integrated into and dedicated to the interior imaging system, and are deleted after analysis.

The rear-view imaging system is typically used for the applications of back-up assistance and parking assistance. Typically, digital images captured by the rear-view camera 113 are rendered and displayed on a video display to provide live video to the operator of the motor vehicle 105. The captured digital images may also analyzed by a signal processor integrated into and dedicated to the rear-view imaging system in order to provide warnings to the operator. The captured digital images are not stored, and are deleted after they are displayed or analyzed.

Prior art automotive imaging systems have been described for accident detection and subsequent video image capture and recording. Two examples of such systems are U.S. Pat. No. 6,141,611 to Mackey et al., entitled "Mobile vehicle accident data system," and U.S. Pat. No. 7,348,895 to Lagassey, entitled "Advanced automobile accident detection, data recordation and reporting system." In U.S. Pat. No. 6,141,611 a system is described where one or more video cameras are mounted on a vehicle to continuously record the vehicle surroundings. This video data is stored on-board along with other operational parameters and data. The on-board storage memory is a First-In-First-Out (FIFO) buffer with a specified size, so that only the most recent images are available, and earlier images are overwritten. Upon detection of an accident, the stored images and data are locked and automatically transmitted wirelessly to a central database. Continuous recording of all cameras requires a very large memory and captures information that is not relevant to the accident at the same rate and resolution as image captured during the accident. No images are captured after the accident. Additionally, no provisions are made for multi-use of the one or more cameras mounted to the exterior of the vehicle or for flexible operation of the accident recording system. This fixed and dedicated function is not cost effective. This is pointed out by U.S. Pat. No. 7,348,895 which proposes accident detection and imaging systems at intersections rather than in a motor vehicle. While this solves the problem of high cost, it does not provide adequate coverage for all accidents since many accidents do not occur at intersections.

Other prior art automotive imaging systems are directed at security and anti-theft. Two such instances are described in U.S. Pat. No. 7,500,794 to Clark, entitled "Concealed vehicular camera surveillance system," and U.S. Patent Application Publication 2003/0081121 to Kirmuss, entitled "Mobile digital video monitoring with pre-event recording." These references are directed to imaging systems located in the motor vehicle of a law enforcement authority to record traffic stops, or surveillance of other suspected crimes. Both are dedicated imaging systems and are not integrated with other systems and do not have multiple functions. Both require activation and operation by the operator or law enforcement officer.

In U.S. Patent Application Publication 2008/0061951 to Liu, entitled "Image transferrable anti-theft system," a motor vehicle anti-theft system is disclosed. This system utilizes a first camera in the cabin of the vehicle and an optional second camera the cargo area of the vehicle. The cameras are activated only when an entry door is forcibly opened. Upon subsequent starting of the vehicle, video images are transmitted to the vehicle owner's PDA, computer or phone to prompt the owner to save or store the images.

In U.S. Pat. No. 7,602,947 to Lemelson et al., entitled "Facial-recognition vehicle security system," a facial-recognition vehicle security system is described. This system employs one or more interior mounted cameras to view the vehicle operator. If the face of the operator is not recognized as an authorized operator the vehicle is disabled. The video images of this event are not recorded or sent to a third party.

U.S. Patent Application Publication 2008/0165251 to O'Kere, entitled "Camera systems and methods for capturing images in motor vehicles," also describes a camera system for monitoring the interior of a motor vehicle. Cameras are activated by an entrance door opening, by the starting of the vehicle, or manually by a push button in the trunk of the vehicle. In this reference, the images are stored, and a provision for live video transmission to law enforcement authorities or a monitoring service is discussed. In these references the camera systems are specialized or dedicated systems, and are limited to imaging of the vehicle interior and activated only by forced entry or attempt at unauthorized use.

U.S. Pat. No. 7,537,400 to Schmid, entitled "Camera system for a motor vehicle," describes an automotive imaging system with universal camera mount locations located at the front, rear side and interior of the vehicle. These are connected to a central information processing unit in the vehicle. The connection can be wired or wireless. Each mount location is dedicated to a specific imaging function. For example, a camera placed in the rear mount is used only for heads up rear view imaging. In this system, the cameras are simply image capture devices and all image processing, image analysis, and subsequent action/decision based on the analysis for the various imaging functions is done in a central image processing unit. This has the disadvantage of moving all of the analysis and camera sub-system complexity to a central unit. The performance of the central unit must now be extremely high in order to perform all of the possible image analyses and subsequent decisions and information display in parallel. This would make the cost of the integrated system higher. Accident recording is stated as one of the functions that could be carried out by a forward looking camera.

U.S. Patent Application Publication 2003/0098909 to Fritzsche et al., entitled "Process for monitoring the internal space of a vehicle, as well as a vehicle with at least one camera within the vehicle cabin," teaches using a panoramic camera to monitor the interior of a motor vehicle. Images captured by the camera can be transmitted to an emergency aid station in the case of an accident, or to the owner in the case of the activation of an alarm system.

U.S. Patent Application Publication 2007/0216136 to Dietz, entitled "Single camera apparatus and methods for alignment of a trailer hitch," teaches the use of a camera to provide images to a driver to aid in the alignment of a trailer hitch. The system can be configured to transmit images from the camera to the owner in the case of an alarm system activation.

U.S. Pat. No. 7,423,529 to Singer et al., entitled "Systems and methods for mobile security and monitoring," a surveillance system for use in a mobile environment. In some cases, the system utilizes a variety of image and audio sensors to record activity ongoing in the mobile environment. In some embodiments, the recorded activity can be transmitted wirelessly to a remote location.

SUMMARY OF THE INVENTION

The present invention represents a motor vehicle system for automatically reporting exception events, comprising:
    a motor vehicle;
    one or more digital cameras, at least one digital camera having a primary function;
    an image memory system for storing digital images captured by the one or more digital cameras;
    means for detecting exception events;
    wireless communications system for communicating with a central reporting service;
    a processor; and
    a program memory storing executable instruction for causing the processor to perform the steps of:
        using at least one of the digital cameras in a secondary function different from its primary function to periodically capture digital images at a specified capture frequency;
        storing the periodically captured digital images in the image memory for a specified period of time;
        receiving input from the means for detecting an exception event; and
        in response to the detection of an exception event:
            opening a communication link to the central reporting service using the wireless communications system, and
            transmitting one or more of the stored periodically captured digital images to the central reporting service over the communications link.

An advantage of the present invention is that it can make use of digital camera systems that are integrated into a motor vehicle for other purposes to provide enhanced features for reporting exception events such as motor vehicle accident events, unauthorized motor vehicle usage events and security system events. This provides a cost advantage since the digital camera systems can be used for multiple purposes.

It has the further advantage that the transmission of digital images to a central reporting service can provide an improved ability to assess the status and medical needs of the motor vehicle occupants in the case of a motor vehicle accident, hijacking or theft. The captured digital images can also be used by accident and law enforcement investigators to ascertain key information related to the causes and culprits of these exception events.

It has the additional advantage that the transmitted digital images can be used by law enforcement agencies to aid in the recovery of stolen or hijacked motor vehicles, and damaged or stolen property in the vicinity of the motor vehicle.

Figure 1:
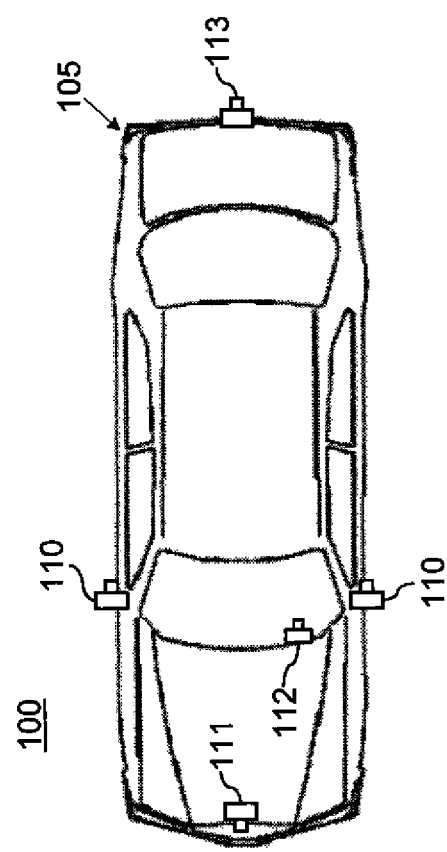
FIG. 1 is a is a top view diagram of a prior art motor vehicle incorporating four digital camera systems.

It is to be understood that the attached drawings are for purposes of illustrating the concepts of the invention and may not be to scale.

DETAILED DESCRIPTION OF THE INVENTION

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected, or an indirect connection through one or more passive or active intermediary devices. The term "circuit" means either a single component or a multiplicity of components, either active or passive, that are connected together to provide a desired function. The term "signal" means at least one current, voltage, charge, or data signal.

Additionally, directional terms such as "on", "over", "top", "bottom", are used with reference to the orientation of the figure being described. Because components of embodiments of the present invention can be positioned in a number of different orientations, the directional terminology is used for purposes of illustration only and is in no way limiting.

In the following description, some elements of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

In accordance with the present invention, one or more digital camera systems are integrated into a motor vehicle and used in conjunction with additional components to provide an aggregated motor vehicle imaging system for automatically recording and reporting exception events. An embodiment of the present invention will now be described with reference to FIG. 2, which is a top view of a motor vehicle imaging system 200 including a motor vehicle 205 fitted with four digital camera imaging systems. Although not shown in FIG. 2, the motor vehicle 205 will generally contain other systems and sensors that are not directly related to imaging, such as GPS receivers, accelerometers, temperature sensors, and speed sensors that are used in various functions of the motor vehicle 205. The outputs of such systems and sensors can be utilized in the motor vehicle imaging system 200 of the present inventions to aid in detection of what will be referred to as an exception event. Details of the exception event detection and subsequent operation of the motor vehicle imaging system 200 are provided in following paragraphs.

Figure 2:
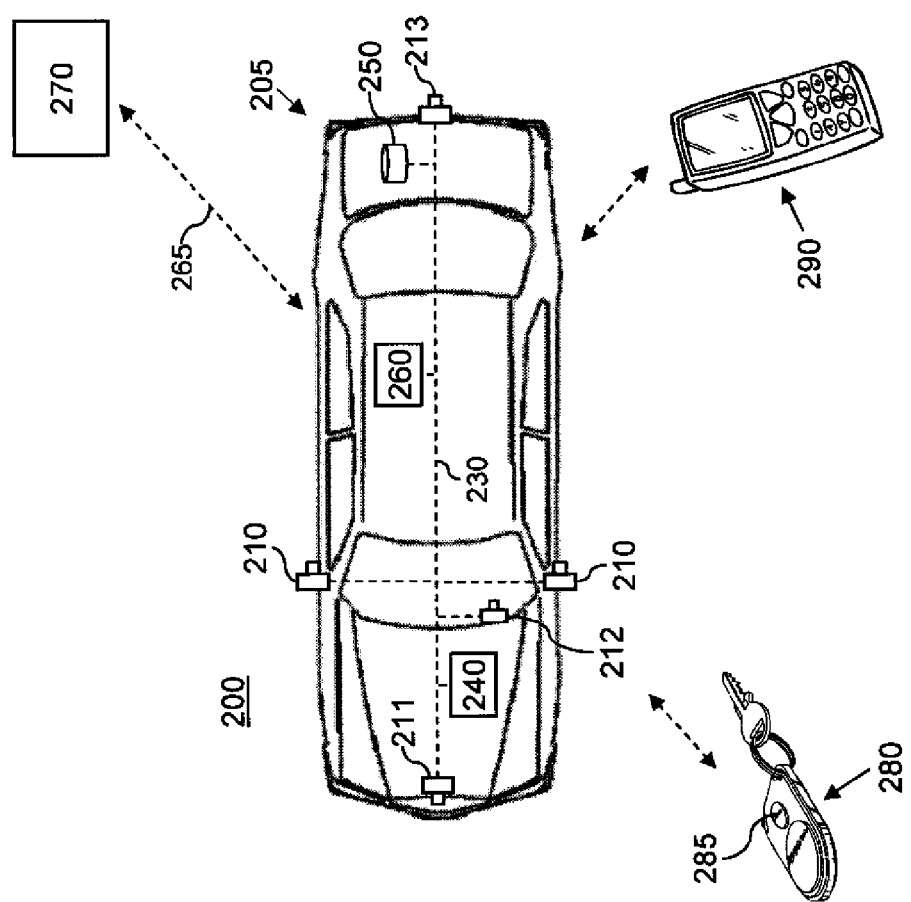
FIG. 2 is a top view diagram of a motor vehicle for automatically reporting exception events according to an embodiment.

The motor vehicle imaging system 200 of FIG. 2 includes four digital camera imaging systems: a blind-spot imaging system including two blind-spot cameras 210, one in each side view mirror; a forward-looking imaging system including a forward-looking camera 211 mounted on the front of the vehicle; an interior imaging system including an interior-view camera 212 mounted to view the driver and occupants of the vehicle; and a rear-view imaging system including a rear-view camera 213 mounted at the rear of the motor vehicle 205. The interior-view camera 212 captures images of the interior of the motor vehicle, while the blind-spot cameras 210, the forward-looking camera 211 and the rear-view camera 213 capture images of the external surroundings of the motor vehicle.

The four digital camera imaging systems are connected to a common input/output data bus (I/O bus) 230. The I/O bus 230 can be wired or wireless. The I/O bus 230 connects a master control processor 240 to the inputs of each of the four digital camera imaging systems. The master control processor 240 provides signals that are used to control the operation of the four digital camera imaging systems. The I/O bus 230 is also connected to a memory system 250.

Image data captured by the digital cameras in the four digital camera imaging systems (blind spot cameras 210, forward-looking camera 211, interior-view camera 212 and rear-view camera 213 are output to the common I/O bus 230 for communication to the master control processor 240 and storage in the memory system 250.

Other metadata is typically provided for storage in the memory system 250 together with the image data. This metadata can include, for example, time, date, location, capture camera characteristics, speed, direction of travel, temperature, and driver identity. The metadata can be obtained from other systems and sensors integrated in the motor vehicle such as GPS receivers.

In a preferred embodiment, the image data is stored in a raw form without further image processing. Additional image processing may be done during review of the stored data. Any additional image processing may also make use of the metadata stored along with the raw image data. Preferably, the memory system 250 is a non-volatile memory system and is provided in a secure enclosure so that any data stored in the memory system 250 would remain intact and useful after an event such as an accident, fire, submersion or other catastrophe. A smaller amount of storage memory may be allocated in the memory system 250 for the normal or standard operation of the motor vehicle. A larger amount of storage memory would generally be allocated in the memory system 250 for the storage of digital images (still image or video clips) and attendant metadata and information that may be relevant to any exception event that may be detected. Alternately, or additionally, the memory system 250 could be provided in a remote location, wherein the output data is sent to the remote location by means of a wireless communication system 260, which can transmit data to a remote system across a wireless communication link 265 (e.g., an RF communication link).

In a preferred embodiment, the digital images and information can not be deleted or reset by the driver or other entity so that they could serve as a secure record of the circumstances relating to any exception events. Generally, the digital images would be deleted after a specified time interval during which no exception events are detected to free up memory for storing new digital images and metadata. The digital image data and attendant metadata can be externally accessible to the owner, and other authorized parties, in order to provide important information related to any exception events.

Operation of the motor vehicle imaging system 200 according to a preferred embodiment of the present invention will now be described. A first mode of operation is referred to as standard operation. Standard operation refers to what is considered as standard driving or operation of the motor vehicle. During standard operation of the motor vehicle, the four digital camera systems perform their primary functions, which would be, for example, the functions described with reference to the digital camera systems in FIG. 1. In addition to their primary functions, each of the digital camera systems periodically provides a digital image or a short video sequence for storage in the memory system 250. For example, in one embodiment, a 1 second video clip is stored in the memory system 250 every 30 seconds. It will be obvious to one skilled in the art that digital images can be stored according to many different timing sequences in accordance with the present invention. For example, in another embodiment, a single digital image from each digital camera can be stored in the memory system 250 every 2 seconds. By capturing video and attendant data in this manner, rather than continuous capture, less memory is required on the vehicle, and much less data needs to be transmitted as a result of an exception event as will be described later. In another embodiment, operational parameters related to the motor vehicle operation can be used to determine the frequency of the periodic image captures. Operational parameters would include motor vehicle location, speed and road conditions. For example, if a vehicle is determined via GPS data to be in a high accident or high crime area, the video captures can be taken more frequently. In another example, the frequency of video capture can be increased as the speed of the vehicle increases. In another example, the frequency of video capture can in increased when it is determined that the vehicle is at an intersection, pulling out onto or making a turn onto a known busy roadway, or being operated in adverse weather conditions.

The periodic storage of the digital images from the four digital camera imaging systems can generally happen concurrently with the normal functions that are performed by the digital camera imaging systems. In other cases, the storage of the digital images can be interleaved with the normal functions of the digital camera imaging systems. In some cases, one or more of the digital camera imaging systems may function only for the periodic video capture and may not be multiplexed with another imaging function. For example, the rear view imaging system is normally not operating unless the motor vehicle is in reverse. However, even if a particular camera is not being used to perform its normal functions, it can still be used to provide periodic image capture.

In some embodiments, digital images may only be stored from a subset of the digital cameras that are present in the motor vehicle 205. For example, digital images may be stored from the forward-looking camera 211, the interior-view camera 212 and the rear-view camera 213, but not from the blind-spot cameras 210.

A second mode of operation of the motor vehicle imaging system 200 is initiated by detection of an exception event. Examples of exception events are accidents or impending accidents, general unauthorized use, theft, and hijacking. In the case of an accident or impending accident, exception event detection can be done by several means, such as those taught by U.S. Pat. No. 7,657,354 to Breed et al., entitled "Vehicular electronic system with crash sensors and occupant protection systems." Some specific examples of accident detection means include use of accelerometers to detect sudden deceleration or change of direction, use of an air bag deployment sensor to detect air bag deployment, use of a door open sensor to detect that a door is open while the car is moving, detection of a sleeping driver by analyzing digital images captured using the interior-view camera 212 or some other form of sleeping driver detector, or detection that the motor vehicle has left the roadway, for example by analyzing digital images captured with the forward-looking camera 211 or by GPS information. In cases where the motor vehicle is used with a trailed object such as a boat trailer or a camping trailer, digital images from the rear-view camera 213 can be automatically analyzed to detect if the trailed object becomes disengaged, or is weaving dangerously and an exception event can be triggered as appropriate. In some embodiments, signals from a plurality of sensing means can be processed to increase the reliability of correctly detecting exception events. For example, detection of an apparently sleeping driver can be combined with detection that the motor vehicle has left the roadway.

In the case of general unauthorized use, detection of an unauthorized mode of operation even can be triggered by detecting that the motor vehicle is traveling at an excessive speed, detecting operation of the motor vehicle at an unauthorized time of day or at an unauthorized location, detecting that the motor vehicle is being driven by an unauthorized person, for example by using face recognition to analyze digital images captured using the interior-view camera 212, or detecting that the motor vehicle is being operated erratically, for example by analyzing digital images captured with the forward-looking camera 211, or analyzing data from other sensors in the vehicle. Methods of detecting theft and hijacking are described later.

In a preferred embodiment, upon detection of exception events classified as accidents or unauthorized use, the four digital camera systems begin to capture continuous video clips. In some embodiments, the capture of the continuous video clips occurs for a specified time interval, which can range from several seconds to many minutes. In other embodiments, the capture of the continuous video clips continues until the memory system 250 is full. The frame rate of the continuous video capture can also be increased for a period immediately after the detection of an exception event. The duration of time and frame rate of the continuous video capture can be adjusted according to the type of exception event that is detected. The duration of time and frame rate can also be adjusted according to the camera resolution, and camera location in or on the motor vehicle 205. For example, in some embodiments, it may be useful for the interior view camera 212 to continue capturing images while establishing an audio link for a longer period of time after detection of an exception event to provide emergency personnel with the ability to assess the condition of the motor vehicle occupants following an accident.

The video images and attendant metadata from the continuous capture are stored in the memory system 250. The attendant metadata will preferably include a flag indicating that the type of exception event that has been detected, together with an indication of what sensor or other system triggered the detection. The memory system 250 will now contain seconds to minutes of viewable video images and attendant metadata for analysis of the exception event. Generally, the captured information will be stored until the system is reset by the motor vehicle owner or some other authorized personnel.

The availability of video images captured from multiple angles and views including inside and outside of the cabin, front side and rear, both before, during and after the exception event, can provide valuable information that can be useful for a variety of purposes. For example, the video images provide valuable information for accident investigators in ascertaining cause of the exception event, identifying other parties involved in the exception event, and determining the status of the motor vehicle 205, the motor vehicle occupants, and the surrounding area after the event.

In a preferred embodiment, in addition to storing the digital images from the various digital cameras to the memory system 250, one or more digital images can be transmitted to a central reporting service 270 over the wireless communication link 265. For example, post-event digital images from the interior view camera 212 can be sent to a monitoring service or law enforcement service via the wireless communication link 265 to provide live view images of the driver and other occupants of the motor vehicle. In the case where the exception event is a motor vehicle accident, the transmitted digital images can be useful for accessing the medical needs of the motor vehicle occupants.

The motor vehicle imaging system 200 is also configured to provide benefits in the event of theft, or hijacking of the motor vehicle. In one embodiment, detection of theft is done by the car security system. When the car alarm is triggered initiating a security system event, all of digital camera imaging systems begin to capture continuous video clips. The interior view camera may also have a higher frame rate than the external view cameras.

After the detection of a security system event (e.g., a theft of a hijacking), in addition to the operation described for accidents or unauthorized use, captured video images from some or all of the digital cameras are then transmitted to a central reporting service 270 (e.g., a monitoring service or a law enforcement service) via the wireless communication link 265 for live view of the interior and exterior of the vehicle. In some embodiments, audio from the vehicle is also transmitted to the monitoring or law enforcement service. Additional information such as vehicle location information from a GPS system can also be communicated over the wireless communication link 265. A security system even can also be initiated by a user calling the monitoring service or the law enforcement service to report the motor vehicle 205 has been stolen. A signal can be sent to the motor vehicle 205 via the wireless communication link 265 to initiate a security system event.

Upon receipt of this notification, the monitoring service or law enforcement service can view the transmitted images and evaluate the other transmitted information to aid in interception of the stolen vehicle, making a decision to remotely disable the vehicle, or performing other intervening measures. The transmitted digital images can also be useful for identifying the thieves.

The triggering of a theft or hijacking event can also be initiated by the driver or occupants of the motor vehicle. In one embodiment, a panic button 285 is provided on a fob 280 that can be carried by the operator of the vehicle. The fob 280 can be a key fob, or a fob intended to be carried independently of a key. Alternatively, or in addition to the panic button 285 provided on the fob 280, one or more vehicle-located panic buttons can also be provided at fixed locations within the motor vehicle 205. Preferably, the vehicle-located panic buttons can be located in multiple concealed, but easily reachable, locations in the motor vehicle 205 so that they can be activated by an occupant held hostage in the vehicle from all areas of the cabin and without detection by the hijackers. A theft/hijacking event can then be initiated by activation of the panic button 285 on the fob 280, or by activation of any of the vehicle-located panic buttons inside of the motor vehicle 205.

Other methods of detection/trigger of theft or hijacking are use of a cellular phone 290 and facial recognition of the driver. For example, the driver or occupants could call a specific number or service to trigger and initiate a theft/hijacking event. Facial recognition technology could also be employed to detect that the driver is not authorized. The facial recognition method of triggering could be disabled by the owner of the vehicle in the case where the vehicle is loaned to another operator of the vehicle.

In addition to providing enhanced imaging functionality for exception events of accident, unauthorized use, theft and hijacking, the motor vehicle imaging system 200 is configured to operate as a security camera system for the vehicle, vehicle contents, or external property/persons/objects. In this case, the exception event is activated by the car alarm system, detection of motion near the car, panic button 285, cellular phone 290, or activation of a home or business security alarm.

While the vehicle is parked, it can be placed in a security monitoring mode. In this mode, all digital cameras are set to periodically take still digital images or short sequences of digital video images. The time period is programmable, and the duration of the video sequence is programmable. For example, a 1 second video clip or a still image can be captured every 2 minutes. Additionally, the system can be programmed to capture images any time motion is detected near the motor vehicle, or when a door to the motor vehicle is opened. The digital image data and attendant metadata is stored in the memory system 250. In addition, or alternately, the digital image data and attendant metadata can be sent by the wireless communication link 265 to a remote image storage location. Examples of remote image storage locations are security monitoring service, or a personal computer. These video images can be viewed by accessing the remote image storage location. One or more of the cameras in the vehicle can be configured to be mechanically or optically adjusted to point at a desired object or location outside or inside the vehicle. For example, a camera could be pointed at the front door or general region of a personal business or residence. The activation and de-activation of the security monitoring mode can also be done remotely using a cellular phone 290 or remote computer (not shown).

Detection of an exception event in the security monitoring mode, such as the activation of a car alarm, causes all digital camera imaging systems to begin capturing continuous video clips. Image data from one or more of the digital cameras can then be transmitted to the central reporting service 270 (e.g., a monitoring service or a law enforcement service) over the wireless communication link 265, together with any relevant metadata such as the location of the motor vehicle. Upon receipt of this notification, the monitoring service or the law enforcement service can view the video and other transmitted information to aid in assessment of the security breach.

It should be noted that although the specific embodiments described herein relate to implementations of the present invention in an automobile, other motor vehicles can similarly employ this invention. Examples of other types of motor vehicles include, but are not limited to, motorcycles, all-terrain vehicles, recreational vehicles, boats, and airplanes.

The invention has been described in detail with particular reference to certain preferred embodiments thereof, but it will be understood that variations and modifications can be effected within the spirit and scope of the invention.

PARTS LIST 100 motor vehicle imaging system
105 motor vehicle
110 blind-spot camera
111 forward-looking camera 112 interior-view camera
113 rear-view camera
200 motor vehicle imaging system
205 motor vehicle
210 blind-spot camera
211 forward-looking camera
212 interior-view camera
213 rear-view camera
230 I/O bus
240 master control processor
250 memory system
260 wireless communication system
265 wireless communication link
270 central reporting service
280 fob
285 panic button
290 cellular phone

The invention claimed is:

1. A system for automatically reporting exception events, the system comprising:
   an image capture device having a first function to monitor operation of a motor vehicle, wherein the image capture device comprises a digital camera configured to capture a video sequence of digital images;
   an image memory system configured to store digital images captured by the image capture device;
   an exception event detection mechanism configured to detect an exception event for the motor vehicle, wherein the exception event detection mechanism is configured to process inputs received from a plurality of sensing devices; and
   a processing system configured to:
      periodically use the image capture device in a second function different from the first function to capture digital images at a first capture frequency;
      store the captured digital images in the image memory system;
      receive an input indicating a detection of the exception event from the exception event detection mechanism;
      determine a type of the exception event based on data captured by the image capture device in the second function;
      store metadata with the captured digital images, wherein the metadata comprises the determined type of the exception event; and
      provide a response to the exception event.

2. The system of claim 1, wherein the response to the exception event comprises transmission of live video images from the digital camera to a central reporting service.

3. The system of claim 1, wherein the response comprises causing the image capture device to capture one or more digital images and transmitting the one or more captured digital images to a central reporting service.

4. The system of claim 1, wherein the image capture device comprises a digital camera configured to capture a video sequence of digital images; and wherein the response comprises transmitting the video sequence of digital images to a second device.

5. The system of claim 1, wherein the exception event comprises a motor vehicle accident.

6. The system of claim 5, wherein the exception event detection mechanism comprises at least one of an accelerometer or an air bag deployment sensor.

7. The system of claim 1, wherein the exception event is triggered by detecting that a trailed vehicle has become disengaged or is weaving erratically.

8. The system of claim 1, wherein the exception event comprises an unauthorized mode of operation event.

9. The system of claim 8, wherein the unauthorized mode of operation event is triggered by detecting that the motor vehicle is traveling at an excessive speed, detecting operation of the motor vehicle at an unauthorized time of day or at an unauthorized location, detecting that the motor vehicle is being driven by an unauthorized person, or detecting that the motor vehicle is being operated erratically.

10. The system of claim 1, wherein the exception event comprises a security system event.

11. The system of claim 10, wherein the security system event comprises at least one of a theft event or a hijacking event.

12. The system of claim 10, wherein the security system event is indicated by a user-activated panic button on a fob, a user-activated panic button located at a fixed location within the motor vehicle, or by a user calling a predetermined phone number.

13. The system of claim 10, wherein the theft event is indicated in response to detecting a theft of the motor vehicle, theft of contents of the motor vehicle, or theft of objects external to the motor vehicle.

14. The system of claim 1, wherein the motor vehicle is an automobile, a motorcycle, an all-terrain vehicle, a recreational vehicle a boat, or an airplane.

15. The system of claim 1, wherein the image capture device is configured to capture images of the surroundings of the motor vehicle.

16. The system of claim 1, wherein the processing system is further configured to terminate the first function of the image capture device in response to the detection of the exception event.

17. The system of claim 1, wherein the first capture frequency varies responsive to operational parameters related to motor vehicle operation.

18. The system of claim 17, wherein the operational parameters comprise at least one of a motor vehicle location, a speed, or road conditions.

19. The system of claim 17, wherein the operational parameters comprise at least one of a motor vehicle location or road conditions.

20. The system of claim 1, further comprising a wireless communications system configured to communicate with a central reporting service, and wherein the response to the exception event comprises:
   opening a communication link to the central reporting service using the wireless communications system; and
   transmitting one or more of the stored periodically captured digital images to the central reporting service over the communications link.

21. The system of claim 1, wherein the metadata comprises at least one of a time, a date, a location, a speed, a direction of travel, or a driver identity.

22. The system of claim 1, wherein the image capture device comprises a digital video camera configured to capture a video sequence of digital images, and wherein the processing system is configured to adjust a duration of time or a frame rate of the video sequence based on a type of the exception event.

23. The system of claim 1, wherein the first function comprises at least one of a blind spot monitoring function, a lane departure warning function, a collision avoidance function, a traffic sign recognition function, or a drowsy driver detection function.

24. The system of claim 1, wherein the processing system is further configured to store the captured digital images in the image memory system for a specified period of time.

25. A method comprising:
- performing, by a processing system, a first function to monitor operation of a motor vehicle via an image capture device, wherein the image capture device comprises a digital camera configured to capture a video sequence of digital images;
- periodically using, by the processing system, the digital camera in a second function different from the first function to capture digital images at a first capture frequency;
- storing, by the processing system, the periodically captured digital images in the image memory system for a specified period of time;
- receiving, at the processing system, an input indicating a detection of an exception event from an exception event detection mechanism, wherein the exception event detection mechanism is configured to process inputs received from a plurality of sensing devices;
- determining, by the processing system, a type of the exception event based on data captured by the image capture device in the second function;
- storing, by the processing system, metadata with the captured digital images, wherein the metadata comprises the determined type of the exception event; and
- providing, by the processing system, a response to the exception event.

26. The system of claim 1, wherein the processing system is further configured to adjust the first capture frequency based on the type of the exception event.

27. The system of claim 1, wherein the metadata comprises a flag indicating the determined type of the exception event.

28. The system of claim 1, wherein the processing system is further configured to:
- use the image capture device in the second function to capture a video; and
- adjust a length of the video based on the type of the exception event.

* * * * *

UNITED STATES PATENT AND TRADEMARK OFFICE
CERTIFICATE OF CORRECTION

PATENT NO. : 8,836,784 B2
APPLICATION NO. : 12/912790
DATED : September 16, 2014
INVENTOR(S) : Erhardt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this
Twenty-third Day of February, 2016

Michelle K. Lee
*Director of the United States Patent and Trademark Office*